Feb. 1, 1949.  H. H. GREGER  2,460,344
PREPARATION OF ALUMINUM PHOSPHATES
Filed July 13, 1943
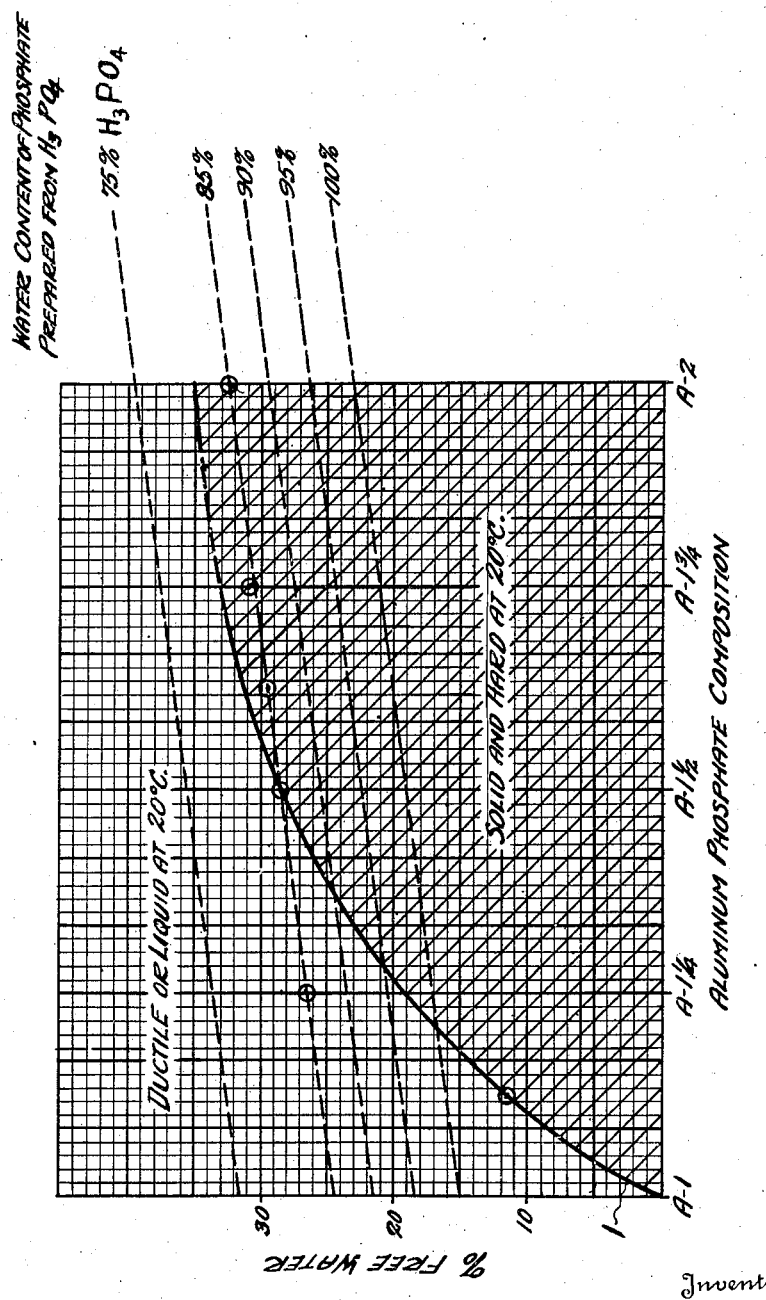
Inventor
HERBERT H. GREGER
By Semmes, Keegin, Beale & Semmes
Attorneys Patented Feb. 1, 1949

2,460,344

UNITED STATES PATENT OFFICE 2,460,344

PREPARATION OF ALUMINUM PHOSPHATES

Herbert H. Greger, Washington, D. C.

Application July 13, 1943, Serial No. 494,527

5 Claims. (Cl. 23—105)

This invention relates to aluminum phosphates and more particularly has reference to a method of preparing soluble aluminum phosphates which are solid at room temperature.

This invention is directed to the preparation of aluminum phosphates of the type described in my copending application Serial No. 490,495, filed June 11, 1943, now forfeited.

I have found that solid aluminum phosphates can be prepared by reacting aluminum hydrate in finely divided form with phosphoric acid of high concentration. If the reaction is not controlled, however, difficulty is encountered in that the product sets rapidly into a hard mass which may be insoluble.

The difficulties in the preparation of the water soluble solid form of aluminum phosphates, particularly those close to and above the sesqui-phosphates, are largely due to their colloidal nature which is related to the water of hydration in the compound. Only the phosphates having a low aluminum content, such as the mono-aluminum phosphate, can be nearly free of water and still remain soluble. They must be nearly free from water before they will solidify and even after solidification such compounds are very ductile. On the other hand, higher aluminum phosphates, such as the di-aluminum phosphate, may contain as much as 25% water and yet be in the form of a hard, brittle solid at room temperatures. If the higher aluminum phosphates, that is, those above the sesqui-aluminum phosphate, are formed with a very low water content, it will be found that the product may no longer be fully soluble in water.

An object of this invention is to provide a method of preparing soluble aluminum phosphates which are solid at room temperatures.

Another object of this invention is to provide a method of preparing soluble aluminum phosphates which are solid at room temperature, which involves controlling the speed of reaction to avoid excessive removal of the water content from the reaction mass.

A further object of this invention is to provide a method of making soluble aluminum phosphates which are solid at room temperatures by carrying out the reaction in stages.

Still another object of this invention is to provide a method of preparing soluble aluminum phosphates which are solid at room temperatures by reacting phosphoric acid and an aluminum containing compound to form a mono-aluminum phosphate and then reacting the mono-aluminum phosphate with finely divided aluminum hydrate to form a higher aluminum phosphate.

It is also an object of this invention to control the temperature of reaction between phosphoric acid and an aluminum compound to maintain a predetermined water content in the reaction mass. In addition, the present invention has as one of its objects a method of preparing soluble aluminum phosphates which are solid at room temperature by controlling the water content of the reactants and the water produced in the reaction to obtain a product having a definite water content.

With these and other objects in view, which will appear more fully hereinafter, the present invention resides in the method hereinafter set forth and the steps followed in carrying out the same.

In the drawings, the single figure is a diagram showing the physical state of aluminum phosphates in relation to the content of free water and composition.

The phosphates to which the present invention relates are those comprised between mono-aluminum phosphate and di-aluminum phosphate, in which the ratio of aluminum to the $PO_4$ radical ranges from 1:3 for mono-aluminum phosphate, $Al(H_2PO_4)_3$, to 2:3 for di-aluminum phosphate, $Al_2(HPO_4)_3$. Many of the phosphates lying at intermediate points in this range have highly desirable properties and are valuable products. The particular compound that is formed depends upon the proportions of the materials which enter into the reaction for the formation of the aluminum phosphate.

The various aluminum phosphates ranging from mono- to di-aluminum phosphates may exist in the liquid or solid phase depending upon the amount of water that is present and the temperature of the product. As illustrated in the single figure of the drawings, a mono-aluminum phosphate designated A—1, that is, an aluminum phosphate in which the ratio of aluminum to $PO_4$ is 1:3, will be at 20° C. a ductile solid when the water content is substantially zero. An aluminum phosphate, such as as the sesqui-aluminum phosphate, in which the ratio of aluminum to $PO_4$ is 1½:3 and designated on the drawings as A—1½, will be solid at 20° C. with a water content of over 25%. The solid di-aluminum phosphate designated on the drawing as A—2 may have, at 20° C., a water content of about 35%.

The curve 1 shown on the drawing represents a zone or line of demarcation between liquid or ductile solid and hard solid aluminum phosphates at 20° C. for phosphates lying between mono- and di-aluminum phosphates at various water contents. The slightly inclined, substantially horizontal dotted lines represent the water content of aluminum phosphates prepared from phosphoric acids of various concentrations. For instance, it will be noted that when an aluminum phosphate is prepared from aluminum hydrate with 100% phosphoric acid, the product will have a water content low enough so that for most of the products it will be in the solid phase. On the other hand, when an aluminum phosphate is made from aluminum hydrate and phosphoric acid of 75% concentration, it will be noted that all of the products are in the liquid phase. This is due to the relatively high water content which is introduced into the product from the dilution of the phosphoric acid.

The water content originates from the content of free water in the acid and from the water of reaction. The latter is important and must not be overlooked as in some cases it may be larger than the amount of free water carried into the compound from the acid.

From the mono- to the sesqui- to the di-aluminum phosphate, the properties change as the aluminum to phosphate ratio increases. For instance, the mono-aluminum phosphate and the compositions close to it have a relatively good solubility in water even when dehydrated at a temperature of 300° F. while the solubility of the higher phosphates may be considerably impaired or even destroyed by heating and drying at this temperature.

In order to understand the solubility of the sesqui- and of the di-aluminum phosphates, it is necessary to consider their colloidal nature. In relatively concentrated solutions where hydrolysis is essentially absent, these phosphates have the properties of colloids. The colloidal state of these solutions is retained in the solids if water is gradually removed from such solutions by drying at moderate temperatures below about 50° C. and hydrated solids are formed. These will disperse in water and form clear, viscous solutions by virtue of their colloidal structure. If this structure is destroyed, the resulting solids are for the most part insoluble in water.

It is very interesting to note that at room temperature the solid state is obtained long before all water is removed. This water is of importance for preserving the solubility of the higher phosphates and the percentage of water retained varies with the alumina-phosphate ratio for a given degree of hardness. For example, at a point where pulverizing can be readily accomplished, the sesqui-aluminum phosphate may contain about 25%, the di-aluminum phosphate as much as or considerably more than 25% of water of hydration.

The solid aluminum phosphates in their hydrated form are essentially an extension of the liquid state or vice versa. By careful control of the water content, it is possible to produce any desired viscosity whether the starting materials are the liquid or the solid aluminum phosphates.

The latter have the appearance of a hard, translucent resin-like material of conchoidal fracture. When heated, they become soft and finally melt to a viscous fluid. When rapidly heated and the temperature reaches the range above 230 to 250° F., depending on the type of phosphate, the vapor tension increases to above atmospheric and the melted material bloats and froths until the dehydration has progressed to the point where it solidifies. This residue is not fully inert to water but the colloidal state cannot be recovered without re-processing.

For commercial purposes, the aluminum phosphates can be handled in many cases much more conveniently in solid than in liquid form. This is true not only for shipping purposes but also in actual product manufacture. A finely divided solid can in many cases be mixed very effectively with other dry, powdered substances. Water may subsequently be introduced in the necessary amount.

There is an essential difference in the production requirements of a liquid and a solid aluminum phosphate. As the water content becomes smaller, such factors as the control of mixing, temperature and rate of reaction and the regulation of the exact water content in the final product becomes more and more difficult.

Several factors have a bearing on this situation. First of all, the aluminum hydrate is not a "strong" base and from the dissociation constants of the secondary and the tertiary hydrogen of the phosphoric acid, it will be seen that once the mono-aluminum phosphate is formed the remaining hydrogens belong to a relatively "weak" or sluggishly reacting acid. For this reason, it is necessary to use, in the production of the higher phosphates, a very finely divided aluminum hydrate and to get it intimately and very uniformly distributed with respect to the phosphoric acid or the phosphoric anhydride, if this is used in place of the acid. The finely divided state and intimate contact will of necessity promote the rate of reaction and consequently a large amount of heat of reaction will be liberated in a very brief space of time. This in turn will have the undesired effect that some of the water intended as a constituent of the final product will be boiled out or lost and the water content will become indefinite. The product may then set up when still hot into a hard mass almost immediately and it may be quite difficult to remove it from the reaction vessel. For all practical purposes, it will be nearly impossible to obtain the necessary perfect uniformity. In mixing a very finely divided base and acid together, even if the temperature is held down by cooling with water, the reaction usually get under way and out of hand before the mixing is complete. This again results in a non-homogeneous product containing lumps of unreacted base and a tacky liquid deficient in aluminum which will not solidify.

It is therefore important to control the reaction rate in order to gain the necessary time for complete mixing. Aside from this, it is necessary to keep the final reaction temperature down for reasons that will become apparent later.

In some instances, it will be necessary to establish the limits of water content because it has been found that for some purposes solid aluminum phosphates which have been dried to too great an extent will not be as useful as the products having the maximum permissible water content for comminuting, or a somewhat lower water content. While it may be unimportant in a number of cases to produce an aluminum phosphate having the maximum permissible water content for the solid state, i. e. aluminum phosphates lying just below the border line indicated by reference character 1 in the drawing, for such purposes as plastic, hot molding compositions, it seems desirable to form solid aluminum phosphates having the maximum practical water content permissible in the solid phase at room temperature.

The solid state also depends on the temperature of the phosphate, and of course a high fluidity of the phosphate at a given temperature will depend on both water content and composition with a tendency toward increased viscosity in the higher aluminum phosphates.

For the production of soluble phosphates, it is not necessary to stay close to the borderline of the solid phosphate, but the water content may be appreciably lower. In fact, the phosphates of low alumina content may be dehydrated almost fully and still have a good solubility.

In accordance with the present invention, a reaction is effected between an aluminum compound and phosphoric acid in a plurality of stages. If desired, the reaction can be started with phosphorous pentoxide. In this instance, the phosphorous pentoxide is converted first to the acid by the addition of the desired amount of water. After cooling the acid, the mono-aluminum phosphate is formed by effecting a reaction between the acid and an aluminum compound such as aluminum hydrate, aluminum oxide (alumina), bauxite, or calcined clay.

It has been found that if the aluminum material is of sufficient coarseness, the reaction between the same and the phosphoric acid will be considerably reduced after the formation of mono-aluminum phosphate. To carry the reaction further and form higher aluminum phosphates up to the di-aluminum phosphate, it is necessary to utilize finely divided aluminous material fine enough to give sufficient contact surface for the reaction to proceed further. Aluminum hydrate having a particle size of between about .3 and about .6 micron is suitable for this purpose. In addition, it will be found necessary to heat the mono-aluminum phosphate and the finely divided aluminum hydrate for several hours in a closed container at about 100° C. The resulting phosphate is glassy clear and by adjusting the initial water content of the acid, solid phosphate may be produced. The water content in the product originates from the content of the free water in the acid and from the water produced as a result of the reaction. The latter is important and should not be overlooked as in some cases it will be larger than the amount of free water carried into the compound by the acid.

It is, of course, possible to combine the formation of acid and mono-aluminum phosphate into one single operation. The amount of heat generated during the reaction is sufficient to vaporize out a certain amount of water which can be restored. For the production of the mono-aluminum phosphate, the grain size of the aluminum hydrate is not of particular importance except it should be relatively coarse, that is, of a size that will pass through 100 to 200 mesh which will prevent an excessively rapid reaction and give time enough for even mixing. Such relatively coarse grain, however, cannot be used in the preparation of the phosphates with a higher aluminum content than the mono-aluminum phosphate. In this step the aluminum hydrate should be extremely fine and for this purpose aluminum hydrate No. C730 of the Aluminum Company of America having a particle size of between .3 to .6 micron is satisfactory. If this hydrate were mixed directly with the acid, the reaction would proceed so rapidly that uniform mixing would be impossible and a lumpy non-homogeneous substance would result. It is therefore necessary to form the mono-aluminum phosphate first from relatively coarse hydrate and in another step using the finely divided aluminum hydrate to form the higher phosphates.

Mono-aluminum phosphate solution is a clear, slightly yellowish, syrupy liquid and the aluminum hydrate No. C730 readily mixes with the mono-aluminum phosphate and, when heated to 100° C., the fine hydrate is dissolved.

A mono-aluminum phosphate may be prepared, for instance, from three mols of phosphorus pentoxide or 426 grams, 156 grams of aluminum hydrate and 108 grams of water which is only enough water to form the mono-aluminum phosphate without water of hydration. If this material is allowed to cool to room temperature, it will form a somewhat ductile solid which may be placed at the zero point of the diagram of the attached drawing.

If this material is prepared from an equivalent amount or 6 mols of phosphoric acid and heated with finely divided aluminum hydrate having a particle size ranging between .3 and .6 of a micron at a temperature of about 100° C. in a closed vessel, the finely divided aluminum hydrate will be dissolved and a reaction will take place resulting in the formation of a higher aluminum phosphate depending upon the proportions of the material entering the reaction. If this material is allowed to cool to room temperature, it will be solid provided the total water resulting from the reaction and the water content of the acid is not too great for the particular chemical composition formed. In other words, if the material lies below the line or zone indicated by curve I in the drawings, the material will be in solid form.

A mono-aluminum phosphate may be prepared by reacting 85% phosphoric acid ($H_3PO_4$) with aluminum hydrate ($Al_2O_3.3H_2O$) of about 200 mesh in the ratio of 6 mols or 692 parts by weight of phosphoric acid to 1 mol or 156 parts by weight of aluminum hydrate. This will result in a mono-aluminum phosphate containing about 212 parts of water or approximately 24.8% water. Of the 212 parts of water in the mono-aluminum phosphate, about 104 parts were introduced as water of dilution of the acid and approximately 108 parts were formed by the reaction between the phosphoric acid and the aluminum hydrate.

To prepare an aluminum phosphate in which the aluminum to phosphate ratio is 1¼:3, there should be added to about 848 parts of the prepared mono-aluminum phosphate, about 39 parts of aluminum hydrate ($Al_2O_3.3H_2O$) in finely divided form.

It has been found that a finely divided aluminum hydrate having a particle size ranging between .3 and .6 of a micron is suitable for entering into a reaction with mono-aluminum phosphate to form aluminum phosphates having higher aluminum concentrations. After thoroughly mixing the finely divided aluminum hydrate and the mono-aluminum phosphate, the resulting mass is heated to about 100° C. in a closed vessel. After the reaction is complete, the aluminum phosphate formed will exist in the form of a very heavy viscous liquid at room temperature. As will be noted from the chart shown in the drawing, an aluminum phosphate prepared as described above and having an aluminum to phosphate ratio of 1¼:3 will contain between 26 and 27% water.

If there is added to 848 parts by weight of the mono-aluminum phosphate, about 78 parts by weight of finely divided aluminum hydrate having a particle size ranging between .3 and .6 of a micron under the conditions specified hereinbefore, i. e. by heating to about 100° C. in a closed vessel, an aluminum phosphate having an aluminum to phosphate ratio of 1½:3 will be formed. This product is in the form of a ductile solid at room temperature and contains slightly more than 28% of water.

By reacting 848 parts by weight of the mono-aluminum phosphate with 97.5 parts by weight of the finely divided aluminum hydrate having a particle size of .3 to .6 micron, under reaction conditions as specified above, an aluminum phosphate having an aluminum to phosphate ratio of 1⅝:3 will be formed. This material will be a definite hard solid body and as indicated on the chart of the drawing, this material will have a water content of about 29½%.

An aluminum phosphate having an aluminum to phosphate ratio of 1¾:3 may be prepared by reacting 848 parts by weight of the mono-aluminum phosphate with about 117 parts by weight of the finely divided aluminum hydrate having a particle size between .3 and .6 micron under the reaction conditions specified above. This material at room temperature is a hard brittle solid and as indicated in the chart of the drawing has a water content of between 30 and 31%.

The dotted lines having the captions 90, 95 and 100% indicate the water content of the various aluminum phosphates prepared from acids of these concentrations provided none of the water introduced into the phosphate through the acid is allowed to escape during the reaction and provided no water from an extraneous source is added.

From the foregoing, it will be noted that an aluminum phosphate having an aluminum to phosphate radical ratio of 1¼:3 is a very heavy liquid at room temperature; the aluminum phosphate having an aluminum to phosphate ratio of 1½:3, i. e. the sesqui-phosphate is a slightly ductile solid at room temperature. On the other hand, the aluminum phosphate having an aluminum to phosphate ratio above 1½:3, i. e. 1⅝:3 or 1¾:3 and the higher aluminum phosphates up to the di-aluminum phosphate are quite hard and brittle. All of the aluminum phosphates except the di-aluminum phosphate are clear and fully reacted and all except the di-aluminum phosphate bloat considerably on quick heating. The sesqui-phosphate prepared from the 85% phosphoric acid containing about 28½% free water or water of hydration is too close to the edge of the soft state to be grindable without proper precautions. Of course, if this material is dried to reduce the water content to bring the material well below the line represented by curve I in the drawing, it will be converted into a hard, brittle substance. If a sesqui-aluminum phosphate is prepared from 90% phosphoric acid, a hard, brittle substance is formed. On the other hand, if an aluminum phosphate having an aluminum to phosphate ratio of 1⅝:3 is prepared with 85% phosphoric acid, a substance will be formed which is hard and brittle at room temperature.

The water in the various phosphates is held tenaciously at temperatures near the boiling point of water and it is necessary to increase the temperature to about 200–250° F. for eliminating a part or all of the water. In some instances, even when heated to 300° F., a certain amount of water of hydration remains in the phosphate.

While in the foregoing description it has been indicated that the reaction may be broken down into two stages, the first of which results in the formation of a mono-aluminum phosphate and the second of which involves the reaction between the so formed mono-aluminum phosphate and finely divided aluminum hydrate, it should be noted that it is within the concept of the present invention to form an aluminum phosphate having a lower aluminum content than is represented by the mono-aluminum phosphate, for instance, an aluminum phosphate having an alumina-phosphate ratio of ½:3 may be first formed and this material reacted with finely divided aluminum hydrate to form higher aluminum phosphate. Thus, by first forming an aluminum phosphate having a low alumina content and later reacting this phosphate with further aluminum hydrate to form an aluminum phosphate having a high alumina content, the temperature of the reactions can be more accurately controlled and the water content of the resulting product determined. The aluminum to phosphate ratio of the aluminum phosphate formed in the first stage may vary between ½:3 and 1:3, depending upon the will of the operator.

In the foregoing description, the term "room temperature" is intended to mean those temperatures occurring in plants where the product of this invention is made and used.

Generally, a given aluminum phosphate having a certain water content and which is solid at a given temperature will be solid at lower temperatures but may not be solid at a higher temperature. By reducing the water content of the material, it will remain solid even at higher temperatures. The aluminum phosphates which are soluble and are solid at room temperatures are very useful in the manufacture of various products in which aluminum phosphates act as binders, etc. The present invention provides a simple and yet very satisfactory method of controlling the formation of soluble aluminum phosphates which are solid at room temperatures.

I claim:

1. A method of making water soluble aluminum phosphates up to di-aluminum phosphate solid at room temperatures comprising reacting relatively coarse aluminum hydrate with phosphoric acid in proportions to form $Al(H_2PO_4)_3$ and then reacting the $Al(H_2PO_4)_3$ with finely divided aluminum hydrate at a temperature of about 100° C. for several hours to form higher aluminum phosphates, and controlling the water content of the reactants and the reaction mass to form a solid water soluble compound having a water content ranging from zero for the 1:3 alumina to phosphate ratio to slightly over 25% for the 1½:3 alumina to phosphate ratio to about 35% for the 2:3 alumina to phosphate ratio.

2. A method of making water soluble aluminum phosphates up to di-aluminum phosphate solid at room temperatures comprising reacting relatively coarse aluminum hydrate wtih phosphoric acid in proportions to form $Al(H_2PO_4)_3$, and then adding aluminum hydrate of a much finer grain size to form phosphates of a higher aluminum content up to di-aluminum phosphate and having a water content ranging from zero for the 1:3 alumina to phosphate ratio to slightly over 25% for the 1½:3 alumina to phosphate ratio to about 35% for the 2:3 alumina to phosphate ratio and controlling the temperature of the reaction mixture during the addition of the fine aluminum hydrate at about 100° C.

3. A method of making water soluble aluminum phosphates up to di-aluminum phosphate solid at room temperatures comprising reacting relatively coarse aluminum hydrate of a particle size ranging from 100–200 mesh with phosphoric acid in proportions to form $Al(H_2PO_4)_3$, and then adding aluminum hydrate of a much finer grain size to form phosphates of a higher aluminum content up to di-aluminum phosphate and having a water content ranging from zero for the 1:3 alumina to phosphate ratio to slightly over 25% for the 1½:3 alumina to phosphate ratio to about 35% for the 2:3 alumina to phosphate ratio and controlling the temperature of the reaction mixture during the addition of the fine aluminum hydrate at about 100° C.

4. A method of making water soluble aluminum phosphates up to di-aluminum phosphate solid at room temperatures comprising reacting relatively coarse aluminum hydrate of a particle size ranging from 100–200 mesh with phosphoric acid in proportions to form $Al(H_2PO_4)_3$, and then adding aluminum hydrate of a particle size ranging from .3 to .6 microns to form phosphates of a higher aluminum content up to di-aluminum phosphate and having a water content ranging from zero for the 1:3 alumina to phosphate ratio to slightly over 25% for the 1½:3 alumina to phosphate ratio to about 35% for the 2:3 alumina to phosphate ratio and controlling the temperature of the reaction mixture during the addition of the fine aluminum hydrate at about 100° C.

5. A method of making water soluble aluminum phosphates up to di-aluminum phosphate solid at room temperatures comprising reacting relatively coarse aluminum hydrate of a particle size ranging from 100–200 mesh with phosphoric acid in proportions to form $Al(H_2PO_4)_3$, and then adding aluminum hydrate of a particle size ranging from .3 to .6 microns and heating to a temperature of about 100° C. to form phosphates of a higher aluminum content up to di-aluminum phosphate and having a water content ranging from zero for the 1:3 alumina to phosphate ratio to slightly over 25% for the 1½:3 alumina to phosphate ratio to about 35% for the 2:3 alumina to phosphate ratio.

HERBERT H. GREGER.

REFERENCES CITED

The following references are of record in the file of this patent:

UNITED STATES PATENTS

| Number | Name | Date |
| --- | --- | --- |
| 1,499,611 | Gravell | July 1, 1924 |
| 1,961,127 | Coleman | June 5, 1934 |
| 1,998,182 | Anable | Apr. 16, 1935 |
| 2,160,700 | Knox | May 30, 1939 |
| 2,161,290 | Grimm | June 6, 1939 |

OTHER REFERENCES

Mellor—Comprehensive Treatise on Inorganic and Theoretical Chemistry, vol. 5, Longmans, N. Y., 1924, page 365.